United States Patent
Keely

[11] 3,834,361
[45] Sept. 10, 1974

[54] BACK-UP FUEL CONTROL SYSTEM
[75] Inventor: William A. Keely, Highland, Mich.
[73] Assignee: The Bendix Corporation, Southfield, Mich.
[22] Filed: Aug. 23, 1972
[21] Appl. No.: 283,145

[52] U.S. Cl......... 123/32 EA, 60/39.28 R, 60/39.09, 415/10
[51] Int. Cl......... F01b 25/08, F02g 3/00, F02b 3/00
[58] Field of Search....... 123/32 EA, 32 AE, 139 E; 415/10; 60/39.28 R, 39.28 T, 39.09

[56] References Cited
UNITED STATES PATENTS
| | | | |
|---|---|---|---|
| 3,098,356 | 7/1963 | Joline | 60/39.28 R |
| 3,274,443 | 9/1966 | Eggenberger | 1/1 |
| 3,578,871 | 5/1971 | Sakamoto | 415/10 |
| 3,732,853 | 5/1973 | Wilkinson | 123/32 EA |

Primary Examiner—Charles J. Myhre
Assistant Examiner—Ronald B. Cox
Attorney, Agent, or Firm—James R. Ignatowski

[57] ABSTRACT

A back-up fuel control system is disclosed herein for sustaining the operation of an electronic fuel control system of an internal combustion engine in the event of a malfunction in the primary fuel control computer or its associated sensors. The back-up fuel control system comprises an unsophisticated electronic computer which responds to a minimal number of engine sensors and generates a signal indicative of the engine's fuel requirements and a failure detection circuit monitoring the performance of the primary fuel control computer. The failure detection circuit automatically activates the back-up fuel control computer and switches the fuel delivery means response from the signals generated by the primary fuel control computer to the signals generated by the back-up fuel control computer.

16 Claims, 3 Drawing Figures

BACK-UP FUEL CONTROL SYSTEM

BACKGROUND OF THE INVENTION

This invention relates to the field of electronic fuel control systems delivering a metered quantity of fuel to an internal combustion engine in response to manual commands from the operator and inputs from at least one selected sensor measuring the engine's operating conditions. The use of these electronic fuel control systems is rapidly increasing as the individual components and the control circuits become more efficient and more reliable. The switchover from carburetor-type fuel delivery systems to the more efficient electronic fuel control systems is being hastened by the general public demand for the reduction in the pollution caused by the contemporary internal combustion engine. The development of these electronic fuel control systems has progressed to the point of practicality and automobiles equipped with electronically controlled fuel control systems are readily available to the public.

Although the components and the electronic circuits of these fuel delivery systems are highly reliable, they are complex and subject to failure in one form or another. Typical, private, commercial, industrial, and agricultural uses of internal combustion engines subject the components to extreme environmental conditions and often severe mechanical vibration and shock. A simple failure of a component in the electronics circuitry or of any of the associated sensors which provide information to the electronic fuel control computer, may disable the fuel delivery system causing the engine to operate very poorly or more likely to stop. Failure in most instances would be a nuisance to the operator, and in many cases, result in considerable hardship while being a potential safety hazard under certain conditions of vehicle operation.

SUMMARY OF THE INVENTION

The present invention concerns itself with a back-up electronic fuel control system that would be automatically employed when a malfunction occurs in the primary electronic fuel control system of the internal combustion engine. The back-up electronic control computer is relatively unsophisticated, compared with the primary system, but is capable of sustaining the operation of the engine until repair of the primary system can be made. The circuit of the back-up computer is relatively simple and can be packaged in a single hybrid package that can be treated as a single component in the fuel control system. The back-up computer utilizes three independent sensors, one sensing the operator's command, a second sensing the engine's speed, and the third sensing the engine's temperature. These three sensors give a first order approximation of the engine's fuel requirement which is adequate to start and sustain the operation of the engine for a limited period of time. Although this system may be considered an inefficient method of providing fuel to the engine, it is better than no fuel at all. In the preferred embodiment the back-up system is automatically activated when the primary system malfunctions causing the engine to lose power or stop. The automatic activation of the back-up fuel control computer is accomplished by a failure detection circuit monitoring the performance of the primary fuel control computer. The failure detection circuit upon the detection of a malfunction activates the back-up fuel control computer and immediately switches the fuel delivery mechanisms response from the primary computer to the back-up computer. Provisions are made in the failure detection circuit to compensate for the special functions of the primary fuel control computer, which result in output signals, which may appear as a malfunction to the failure detection circuit. Some of these special functions are cold start fuel enrichment, acceleration enrichment, and deceleration fuel cut-off. A warning light may be added to the instrument panel of the automobile that is activated with the activation of the back-up electronic fuel control system giving the operator a visual indication that the engine is operating on the back-up fuel control system.

DETAILED DESCRIPTION OF THE PREFERRED EMBODIMENT

Figure 1:
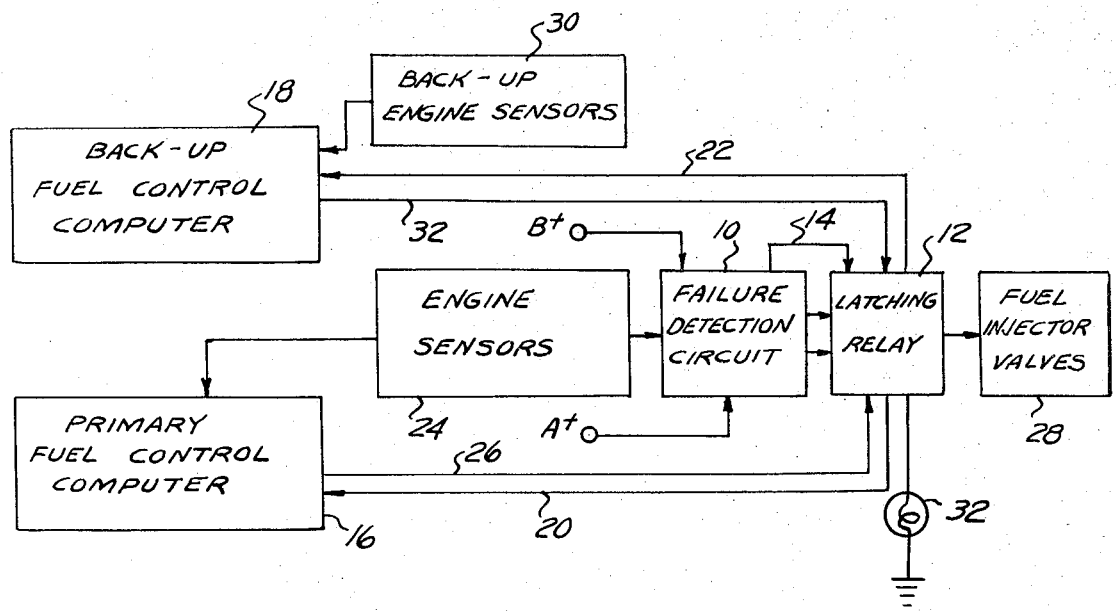
FIG. 1 is a block diagram of an internal combustion engine fuel control system incorporating the inventive back-up fuel control computer and failure detection circuit.

Referring to FIG. 1, a fuel control system for an internal combustion engine is shown in schematic form. The system is energized by an electrical power source designated as B+ applying power to the failure detection circuit 10. The electrical power source may be a battery or an engine driven electrical power generating system conventionally coupled to an internal combustion engine. A regulated voltage source, designated A+ is also applied to the failure detection circuit as shown. The regulated A+ voltage is derived from a voltage regulator, now shown, receiving its voltage from the B+ voltage source. A person skilled in the art will recognize that the polarity of the power sources may readily be reversed by grounding B+ and applying a B− voltage to all locations indicated as ground. The B+ voltage is further communicated to the Latching Relay 12 by Line 14 where it is communicated alternatively to the Primary Computer 16 and the Back-up Computer 18 by Lines 20 and 22, respectively.

The fuel control system comprises a Primary Fuel Control Computer 16, which responds to the signals generated by a group of engine sensors 24, monitoring the operating parameters of the engine, and generates various signals, including output signals indicative of the fuel requirements of the engine. The engine sensors 24 may comprise a trigger generating electrical signals indicative of both the speed and the crank angle of the engine, an intake manifold absolute pressure sensor, and an engine temperature sensor. The list of sensors above is not intended to be all inclusive, and a person skilled in the art will recognize that alternate types of fuel control computers may require additional or different types of sensors. The output signals generated by the Primary Fuel Control Computer 16 are communicated to Latching Relay 12 on Line 26. In the prior art the output signals generated by the Primary Fuel Control Computer were communicated directly to the fuel delivery means illustrated as Injector Valves 28. The Injector Valves 28 respond to these output signals and control the delivery of fuel to the engine. The injector valves may be activated singularly, in sub groups, or all together as is well known in the art.

Functionally paralleling the Primary Fuel Control Computer 16 is a Back-Up Fuel Control Computer 18 which is responsive to three independent engine sensors. The three sensors, indicated generally in the schematic by Block 30, are a potentiometer, generating a signal indicative of the position of the operator controlled throttle valve; a trigger, which in the preferred embodiment is a signal from the number one spark plug of the engine but may be any alternate electrical signal synchronized with the speed and crank angle of the engine; and an engine temperature sensor to provide a signal for cold start enrichment. The Back-Up Fuel Control Computer 18 also generates output signals indicative of the fuel requirements of the engine which are communicated to the Latching Relay 12 on Line 32.

The Latching Relay 12 in its unlatched position applies B+ voltage to the primary fuel control computer and communicates signals generated by the Primary Fuel Control Computer 16, to the Injector Valves 28. In its latched position, the latching relay applies B+ voltage to the Back-Up Fuel Control Computer 18, communicates the signals generated by the Back-Up Fuel Control Computer 16 to the Fuel Injector Valves 28, and applies a voltage to the Pilot Lamp 32 giving the operator a visual indication that the primary computer has malfunctioned and the engine is operating on the back-up computer.

The Failure Detection Circuit 10 in the preferred embodiment monitors the current being drawn by the Primary Fuel Control Computer 16 and Injector Valves 28 and generates a signal when this current falls below or exceeds predeterminable limits, indicating that the primary fuel control computer or a sensor supplying information to the primary fuel control computer has malfunctioned. It is recognized that a malfunction of the primary computer can be detected by alternate techniques which are functionally equal to the method described herein. For example, analysis of the output pulses generated by the primary computer may also be used to detect a computer failure. The signal generated by the failure detection circuit activates the Latching Relay 12.

Figure 2:
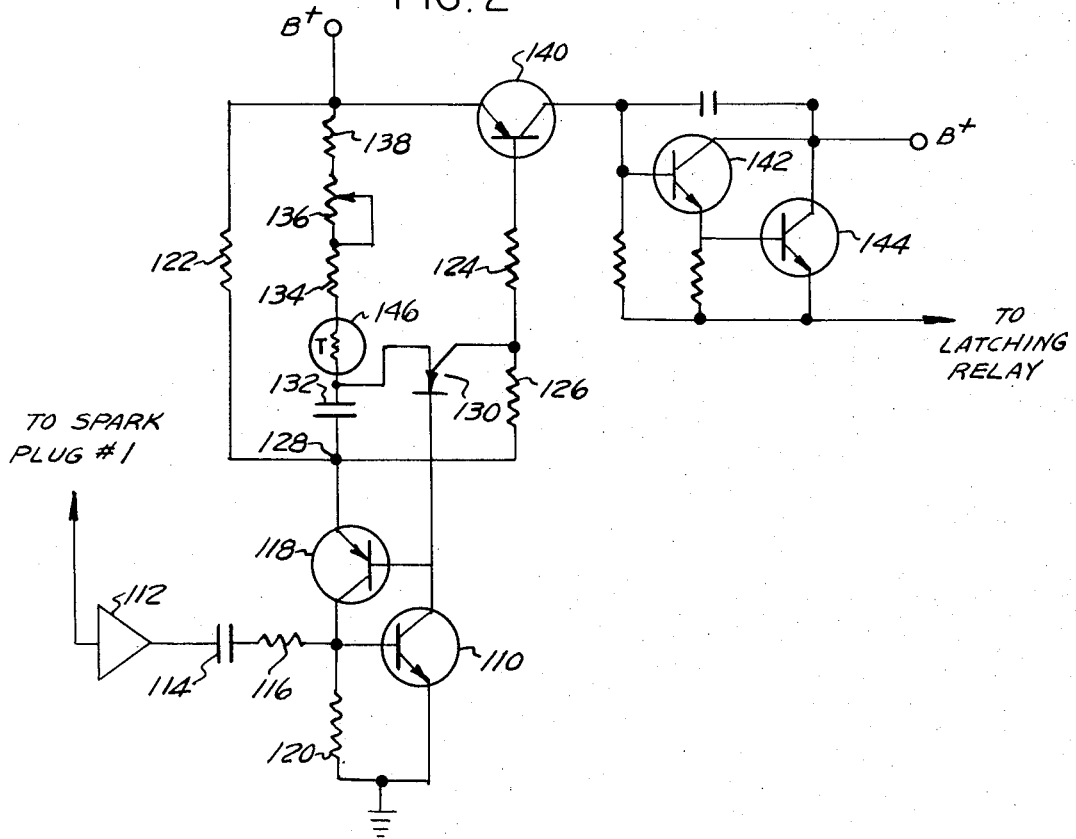
FIG. 2 is an electrical schematic of the back-up fuel control computer.

FIG. 2 shows the circuit details of the back-up fuel control computer. The circuit is shown as being energized from the electrical voltage source designated B+ at the various locations noted which is communicated to the back-up computer from the latching relay as described with reference to FIG. 1. The trigger signal from spark plug number one, not shown, or other source is communicated through Buffer Amplifier 112 to the base of Transistor 110 by means of Coupling Capacitor 114 and current limiting Resistance 116. A positive pulse from the Buffer Amplifier 112 momentarily causes Transistor 110 to conduct providing a low resistance path from the base of Transistor 118 to ground. This low resistance path to ground causes Transistor 118 to conduct and the collector current of Transistor 118 flows through Resistance 120 establishing a positive bias at the base of Transistor 110 latching this circuit with both Transistors 110 and 118 in a conducting state. The current flowing through Transistor 118 also flows through the resistive bridge formed by Resistances 122, 124, 126 and the emitter base junction of Transistor 140 as shown. Current flowing across this resistive bridge causes the circuit point designated 128 to assume an intermediate potential between B+ and ground. Series Resistances 124 and 126 also form a voltage divider and develop a reference potential at their junction which is applied to the gate of Programmable Unijunction Transistor (PUT) 130. The cathode of the PUT 130 is effectively at a ground potential when Transistor 110 is conducting. The potential applied to the anode of PUT 130 is obtained from the RC network comprised of Capacitance 132, Padding Resistance 134, Throttle Position Potentiometer 136, Padding Resistance 138 and cold start correction Thermistor 146. The movable arm of Potentiometer 136 is mechanically linked to the throttle valve or operators throttle control means, and its resistance is indicative of the position of the throttle valve. The resistance of the Potentiometer 136 is determinative of the rate at which Capacitance 132 charges towards B+. The Padding Resistances 134 and 138 are incorporated to adjust the time constant of the RC network so that the length of the generated electric pulses are compatible with the fuel requirements of the engine. One skilled in the art will recognize that the padding resistances may be eliminated by use of a special design potentiometer or mechanically limiting the travel distance of the potentiometer's movable arm within predetermined limits. Thermistor 146 senses the engine temperature and decreases the rate at which Capacitance 132 charges towards B+ when the engine is cold, providing additional fuel for cold start and engine warm-up.

When Transistor 118 conducts, Circuit Point 128 assumes an intermediate potential and current starts to flow through Resistance 134, 136, 138 and Thermistor 146, and simultaneously Capacitance 132 starts to charge towards B+. The increasing potential of the junction between Capacitance 132 and Thermistor 146 is communicated to the anode of PUT 130. When the potential communicated to the anode of the PUT exceeds the potential at the gate, the PUT conducts and communicates a positive electrical signal to the base of Transistor 118. The positive pulse at the base of Transistor 118 causes this transistor to stop conducting terminating the base current flowing through Transistor 140 and Transistor 110 causing both Transistors 110 and 140 to turn "off". The latch is effectively reset and can only be reactivated by a subsequent pulse trigger pulse.

When Transistor 118 conducts in response to an input signal to Transistor 110, base current flows through Transistor 140 as indicated above. This causes Transistor 140 to conduct providing current to the series arranged bases of Transistors 142 and 144 of a Darlington Pair causing them to conduct. When the emitter to base current of Transistor 140 is terminated by the conduction of PUT 130, base current to Transistors 142 and 144 is also terminated ending the pulse. The output current of the Darlington Pair is sufficient to simultaneously activate at least eight fuel injector valves for an internal combustion engine. The electronic circuit of the back-up fuel control computer, with the exception of the throttle position potentiometer 136 and Thermistor 146, is sufficiently simple to be incorporated in a hybrid package and treated as a single component in the fuel control system.

Figure 3:
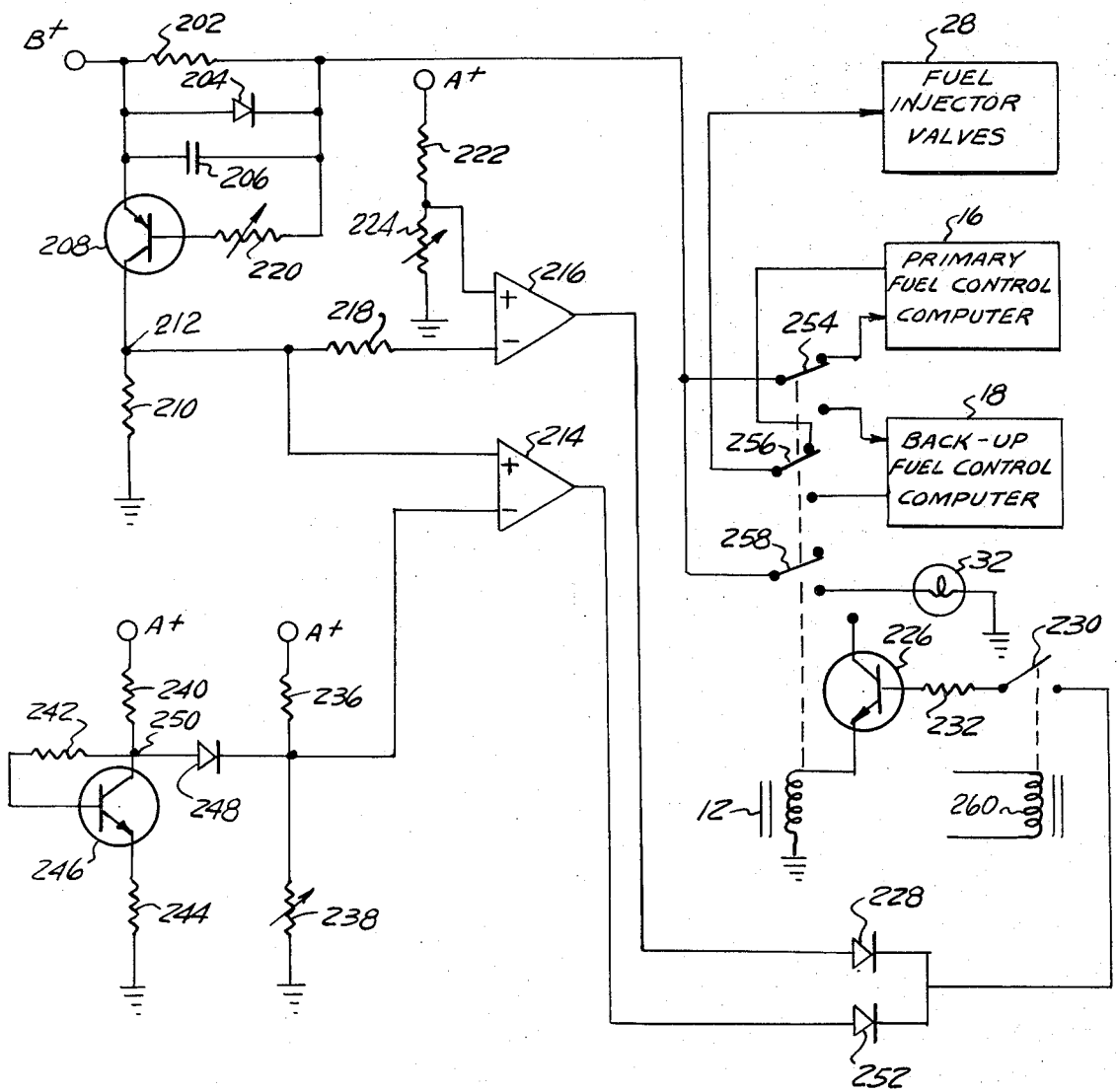
FIG. 3 is an electrical schematic of the failure detection circuit.

FIG. 3 shows the circuit details of the Failure Detection Circuit 22 and the Latching Relay 12. The Primary Fuel Control Computer 16, Back-Up Fuel Control Computer 18 and Injector Valves 28 are shown being alternatively energized by a voltage source designated as B+ through Resistance 202 and the Electrical Switch 254 of Latching Relay 12. The current flowing to the primary fuel control computer develops a potential across Resistance 202 indicative of the current being drawn by both the Primary Computer 16 and Injector Valves 28. The maximum potential developed across Resistance 202 is limited by Diode 204 which assures that the minimum voltage energizing the computer and injector valves does not fall below a minimum value under predeterminable special function conditions discussed later in this specification. Capacitance 206 smooths out the current pulses generated by the normal operation of the primary fuel control computer and the injector valves. The impedance of Resistance 202 is selected so that through the normal range of operation of the fuel control computer and the injector valves, the current drawn will cause the potential drop across Resistance 202 to be less than the predeterminable potential across the Diode 204 which would cause it to saturate.

The potential developed across Resistance 202 is applied across the emitter and base terminal of Transistor 208 causing it to conduct and current to flow through Resistance 210 developing an intermediate potential at Circuit Point 212 which is indicative of the current being drawn by the primary computer and the fuel injectors. This signal is communicated directly to the positive input of Operational Amplifier 214 and to the negative input of Operational Amplifier 216 through Resistance 218. The magnitude of the potential at Circuit Point 212 is adjusted by Trimmer Potentiometer 220 controlling the base current of Transistor 208. A reference potential is applied to the positive input of Operational Amplifier 216 by means of a voltage divider consisting of Resistance 222 and Variable Resistance 224. The voltage divider and other parts of the circuit are shown as being energized by a regulated voltage supply designated as A+ at various locations. The regulated voltage supply derives its power from the B+ voltage supply discussed above, and produces a regulated voltage independent of the voltage fluctuations in the B+ supply. The Operational Amplifier 216 responds to the input signals and generates a latch signal when the potential at 212 is less than the potential across variable Resistance 224 indicating that the current flowing through Resistance 202 is less than a predeterminable minimum value caused by a malfunction of the primary computer. This may be caused by a complete failure of the primary computer to generate any pulses, a failure to generate both sequential pulses, where sequential pulses are generated, or by failure of the computer to activate both sets of injector valves where the two sets are activated alternately.

The latch signal generated by Operational Amplifier 216 turns "on" Transistor 226 through Diode 228, the alternator actuated Switch 230 and the Resistance 232. Transistor 226 in its "on" or "conductive" state activates Latching Relay 12.

A second reference potential is applied to the negative input of Operational Amplifier 214 from the voltage divider consisting of Resistance 236 and Variable Resistance 238. The Operational Amplifier 214 responds to this reference potential and the potential developed at 212 and produces a latch signal when the potential developed at 212 is higher than the reference potential. The reference potential is adjusted by means of Variable Resistance 238 to be higher than the maximum potential that can be generated at 212 when the primary computer is functioning normally. The potential at 212 will only exceed the reference potential when the primary computer malfunctions in a mode which causes the primary computer to generate signals which would cause one or both sets of fuel injector valves to remain open for a period of time which exceeds a predeterminable duty cycle or remain continuously open. The maximum duty cycle for example may be set at 50 percent so that the relay would be activated if either set of fuel injectors remained continuously open.

Fuel enrichment during cold start where the fuel injection pulses exceed the 50 percent duty cycles is an exception to the normal operating conditions of the fuel control system. Cold start fuel enrichment is compensated for by the circuit consisting of Resistances 240, 242 and 244, Transistor 246 and Diode 248. Transistor 246 is a temperature sensor mounted in the water jacket of the engine and its conductance is proportional to the engine coolant temperature. When the engine coolant is cold the conductance of the Transistor 246 is low and the potential at Reference Point 250 is higher than the potential developed across Variable Resistance 238 in the voltage divider. This higher potential is communicated to the negative input to Operational Amplifier 214 through Diode 248 and prevents the operational amplifier from generating a signal when the potential developed at 212 is increased above its normal limits by the long duty cycle of the cold start enrichment pulses. After the coolant warms up, the potential at circuit point 250 falls below the potential developed across Variable Resistance 238. However, this lower signal is blocked by Diode 248. The latching signal generated by Operational Amplifier 214 is also communicated to Transistor 226 by means of Diode 252, Alternator Switch 230 and Resistance 232 which activates Latching Relay 12.

Alternator Switch 230 is activated by Solenoid 260 when the alternator is generating an output signal above a predeterminable value. The alternator switch is included in the circuit to prevent actuation of the latching relay during the starting of the engine or when the ignition switch is turned on with no attempt made to start the engine. This is a condition which would be sensed by the failure Detection Circuit 10 as a failure of the primary computer to generate output pulses. The alternator switch covers both the accidental and intentional conditions because the latching relay cannot be actuated until the engine is running and the alternator generating an electrical signal above a predeterminable level, which is indicative that the engine is running.

The Failure Detection Circuit 10 electronically detects failures in the primary computer which would cause the engine to malfunction and activates the latching relay. The Latching Relay 12 is an electrically activated switch which is operative to be set in one position and remain in that position until actuated by an electrical signal. The electrical signal actuates the relay causing it to switch a series of electrical switches to the alternate position, and the switches will remain in the alternate position until the relay is mechanically or electrically reset back to its original position. In the preferred embodiment, the latching relay comprises at least three double pole single throw electrical switches mechanically linked to the latching relay as shown by the dashed line. The first Switch 254 in its unactuated position applies the B+ voltage to the primary Fuel Control Computer 16 through Resistance 202 and in its actuated position to the Back-Up Fuel Control Computer 18. The second Switch 256 in its unactivated position transmits the output signals from the Primary Computer 16 to the Fuel Injectors 28 and in its activated position transmits the signals generated by the Back-UP Computer 18 to the fuel injectors. The third switch 258 applies B+ power to an Indicator Light 32 when the switch is in the activated position giving the vehicle operator a visual indication that the primary fuel control computer has malfunctioned and the engine is operating on the back-up fuel control computer. One skilled in the art will recognize that when the primary fuel control computer operates the fuel injectors individually or in sub sets, additional switches will be required in the latching relay.

When the failure detection circuit is used in conjunction with primary computers incorporating special function circuits such as acceleration fuel enrichment or deceleration fuel cut-off or both, the signals indicative of enrichment or cutoff can be communicated to the failure detection circuit to inhibit the actuation of the Latching Relay 12 by switches comparable to start Protection Switch 230, or by changing the value of the first and second reference potential by circuit means similar to that used for cold start protection. The deceleration cut-off signal may alternatively be applied to the base of Transistor 208 giving a false signal to Operational Amplifiers 214 and 216.

While the invention is illustrated in a specific embodiment, the invention is not intended to be limited to the details described and illustrated herein. The circuits may be modified, or alternate performance parameters of the Primary Fuel Computer may be monitored to determine a failure without detering from the spirit of the invention.

What is claimed is:

1. In an internal combustion engine fuel control system having operator control means, a plurality of engine sensors operative to generate signals indicative of the engine's operating conditions, a primary fuel control computer responsive to the signals from the control means and from said plurality of engine sensors operative to generate output signals indicative of the engine's fuel requirements, and fuel delivery means including at least one controllable valve member responsive to the output signals from said primary computer operative to control fuel delivery to the engine, said fuel control system further operative to generate a condition signal indicative of the operation of the fuel control system, an improvement comprising:

a back-up fuel control computer responsive to signals from at least one engine sensor for generating output signals indicative of the engine's fuel requirements;

failure detection means responsive to the condition signal generated by the primary fuel control system and at least one engine sensor for generating a switch signal indicative of a failure of the primary fuel control system when the engine is running under its own power and the primary fuel control system generates a condition signal having a value outside a predetermined range, said predetermined range being indicative that the primary fuel control system is generating output signals capable of sustaining the operation of the engine; and latch means having a first state in which the primary computer output signals are communicated to the fuel delivery means and a second state in which the back-up computer output signals are communicated to the fuel delivery means for switching from said first state to said second state in response to said switch signal.

2. The system as claimed in claim 1 wherein said failure detection means comprises:

maximum signal detection means for generating a first switch signal when said condition signal exceeds a predetermined absolute value; and minimum signal detection means for generating a second switch signal when said condition signal is less than a predetermined absolute value;

and wherein said latch means switches from said first state to said second state in response to one of said first and said second switch signals and is operative to remain in said second thereafter.

3. The system as claimed in claim 2 wherein said condition signal is an input current to said primary fuel control system, said failure detection means further includes:

means for converting said input current to a fuel delivery signal indicative of the quantity of fuel being delivered to the engine by the fuel delivery means responding to output signals generated by the primary fuel control chamber;

and wherein said maximum signal detection means comprises:

maximum signal reference means for generating a signal indicative of the maximum value said fuel delivery signal may have within the normal operating limits of said primary control computer; and maximum signal comparator means for generating said first switch signal when said fuel delivery signal exceeds said maximum reference signal;

and wherein said minimum signal detector comprises:

minimum signal reference means for generating a signal indicative of the minimum value, said fuel delivery signal may have within the normal operating limits of said primary fuel control computer; and minimum signal comparator means for generating said second switch signal when said fuel delivery signal is less than said minimum reference signal.

4. The system as claimed in claim 2 wherein said primary fuel control computer further generates function signals indicative of the computer generating output signals outside said predetermined range in response to predeterminable engine operating conditions, said failure detection means further comprises special function means responsive to the function signals generated by the primary fuel control computer and at least one engine sensor for inhibiting the generation of said first and second switch signals when the primary fuel control computer is generating said function signals.

5. The system as claimed in claim 4 wherein said at least one engine sensor is a temperature sensor, generating a signal indicative of the engine's temperature, said special function means comprises:

cold start protection means for inhibiting the generation of said first switch signal when the temperature is below a predetermined value and said primary fuel control computer is generating cold start fuel enrichment signals.

6. The system as claimed in claim 5 wherein said special function means further comprises:
acceleration protection means responsive to function signals generated by said primary fuel control computer for inhibiting the generation of said first switch signal when said primary fuel control computer is generating acceleration fuel enrichment signals; and
deceleration protection means responsive to function signals generated by said primary fuel control computer for inhibiting the generation of said second switch signal when said primary fuel control computer is generating deceleration fuel cut-off signals.

7. The system as claimed in claim 1 wherein said plurality of engine sensors include a sensor generating a non-started signal indicative that the engine is not running under its own power, said improvement further includes means responsive to said non-started signal for inhibiting the switching of the fuel delivery control from the primary fuel control computer to the back-up fuel control computer.

8. The system as claimed in claim 6 wherein said operator control means includes a manually positioned throttle and said plurality of engine sensors include a throttle position sensor generating a signal indicative of the throttle's position and a trigger sensor generating a trigger signal indicative of the occurrence of a cyclic event of the engine, said back-up fuel control computer comprises:
pulse generating means responsive to said throttle position signal and said trigger signal operative to generate a first pulse signal having a pulse width indicative of the engine's fuel requirements; and
amplifier means, for amplifying said first pulse signal to provide sufficient power to activate said fuel delivery means.

9. The system as claimed in claim 8 wherein said pulse generating means comprises:
bistable means, operative to switch from an initial state to a second state in response to a trigger signal for generating a second state signal said bistable means operative to remain in said second state and generate said second state signal until switched to its initial state by a reset signal;
timer means, for generating a reset signal a predeterminable time after receiving said second state signal, said predeterminable time being controlled by said throttle position signal; wherein said first pulse signal is the signal generated by said bistable means in said second state.

10. The system as claimed in claim 9 further comprising an engine temperature sensor, in cooperative association with said throttle position sensor for increasing said predeterminable time between the occurrence of said second state signal and the generation of said reset signal to provide cold start and warm-up fuel enrichment when the engine is cold.

11. A back-up electronic fuel control system for an internal combustion engine having a primary electronic fuel control system, including an engine sensor controlled primary fuel control computer for generating electrical signals and electrically activated fuel delivery means, comprising:

independent engine sensor means generating signals indicative of engine operating conditions independent of the sensors associated with the primary computer;
a back-up fuel control computer, responsive to the signals from at least one independent engine sensor means operative to generate output signals indicative of the engine's fuel requirements;
failure detection means, responsive to signals generated by only the primary fuel control system and at least one engine sensor, for generating a switch signal when the engine is running and the primary fuel control system generates a signal outside a predeterminable range, said predeterminable range being indicative that the primary computer is generating output signals capable of sustaining the operation of the engine, said failure detection means further including a special function compensation means responsive to signals generated by said independent engine sensors and signals generated by the primary fuel control computer for inhibiting the generation of said switch signals when the primary fuel control computer is generating signals in response to predeterminable engine operating conditions which have a value outside said predetermined range; and
latch means having a first state applying said primary computer output signals to said fuel delivery means and a second state applying said back-up computer output signals to said fuel delivery means, for switching from said first state to said second state in response to said switch signal.

12. The system as claimed in claim 11 wherein said failure detection means also includes:
means for converting said primary system signal into a delivery signal indicative of the fuel being supplied to the engine;
maximum signal detection means for generating a first switch signal when said delivery signal exceeds a predetermined value;
minimum signal detection means for generating a second switch signal when said delivery signal is less than a predetermined value;
and wherein said latch means switches from said first state to said second state in response to one of said first and second switch signals.

13. The system as claimed in claim 11 wherein said independent sensors include a trigger sensor generating trigger signals indicative of the engine's crank angle, and a throttle position sensor means generating throttle position signals indicative of the throttle's position, said back-up fuel control computer comprises:
a pulse generator, for generating pulse signals synchronized with said trigger signals and having a pulse duration proportional to the throttle's position; and
amplifier means for amplifying said pulse signals to produce output pulses having sufficient power to activate said fuel delivery means.

14. The system as claimed in claim 13 wherein said pulse generator comprises:
bistable means, switchable from one state to another in response to said trigger signal for generating a signal indicative that said bistable means is in said second state, and further operative to remain in said signal producing second state until reset to its initial state by a reset signal;

pulse shaping means, for generating said reset signal in response to said signal generated by said bistable means and throttle position signal, said reset signal operative to reset said bistable means to its initial state after a predeterminable time, said predeterminable time being determined by said throttle position signal.

15. The system as claimed in claim 14 wherein said pulse shaping means further includes an engine temperature sensor cooperatively associated with said throttle position sensor to control said predeterminable time after which said reset signal is generated to provide cold start and warm-up fuel enrichment when the engine is cold.

16. The system of claim 11 wherein said independent sensors include a sensor generating a non-started signal indicative that the engine is not running under its own power, said system further includes means responsive to said non-started signal for inhibiting the switching of the fuel delivery control from the primary fuel control computer to said back-up fuel control computer.

* * * * *

UNITED STATES PATENT OFFICE
CERTIFICATE OF CORRECTION

Patent No. 3,834,361              Dated September 10, 1974

Inventor(s) William A. Keely

It is certified that error appears in the above-identified patent and that said Letters Patent are hereby corrected as shown below:

Claim 3, Line 31: Replace the word "chamber" with the word

--- computer ---

Signed and sealed this 13th day of May 1975.

(SEAL)
Attest:

RUTH C. MASON
Attesting Officer

C. MARSHALL DANN
Commissioner of Patents
and Trademarks